United States Patent
Bertolini et al.

(12) 
(10) Patent No.: US 6,226,927 B1
(45) Date of Patent: May 8, 2001

(54) AUTOMOBILE VEHICLE DOOR PROVIDED WITH A MULTICOMPONENT MODULE A PART OF WHICH FORMS AN ACOUSTIC CAVITY

(75) Inventors: Carlo Bertolini, Feucherolles; Laurent Arquevaux, Sully sur Loire, both of (FR)

(73) Assignee: Meritor Light Vehicle Systems-France (FR)

( * ) Notice: Subject to any disclaimer, the term of this patent is extended or adjusted under 35 U.S.C. 154(b) by 0 days.

(21) Appl. No.: 09/056,918

(22) Filed: Apr. 8, 1998

(30) Foreign Application Priority Data

Apr. 18, 1997 (FR) .................................................. 97 04844

(51) Int. Cl.[7] ....................................................... B60J 5/04
(52) U.S. Cl. ............................................. 49/502; 181/150
(58) Field of Search .............................. 49/501, 502, 377, 49/352, 348; 181/141, 148, 150; 296/146.7, 150

(56) References Cited

U.S. PATENT DOCUMENTS 4,928,788   5/1990   Erickson ............................... 181/141

FOREIGN PATENT DOCUMENTS

| 3027286A1 | 2/1981 | (DE) . |
|---|---|---|
| 61-132443 | 6/1986 | (JP) . |
| 63-287296 | 11/1988 | (JP) . |
| 04022296 | 1/1992 | (JP) . |
| 06006885 | 1/1994 | (JP) . |

OTHER PUBLICATIONS

Abstract of Japanese No. 04022296 filed on Jan. 27, 1992.
Abstract of Japanese No. 06006885 filed on Jan. 14, 1994.
Abstract of Japanese No. 61132443 filed on Jun. 19, 1986.
Abstract of Japanese No. 63287296 filed on Nov. 24, 1988.

*Primary Examiner*—Daniel P. Stodola
*Assistant Examiner*—Curtis A. Cohen
(74) *Attorney, Agent, or Firm*—Carlson, Gaskey & Olds

(57) ABSTRACT

An automobile vehicle door (1) includes a box structure (3), a module (4) including an acoustic chamber (6) supporting a speaker (7) adapted to be applied on the periphery of an opening (5) formed on the inner side of the box structure and an inner trim panel (8) covering the module. The module is fixed in a watertight manner on the surround of the opening (5) of the box structure, a peripheral rib (12) is provided for defining in the module a volume of air V excited by the rear wave of the speaker, and a vent is provided in the trim panel for returning the rear wave of the speaker in the direction toward a listening zone. With this arrangement, the door is provided with an acoustic enclosure of the "bass reflex" type having a very good acoustic efficiency in respect of the bass frequencies with no risk of entry of water into the compartment of the vehicle through the vent (17).

14 Claims, 3 Drawing Sheets

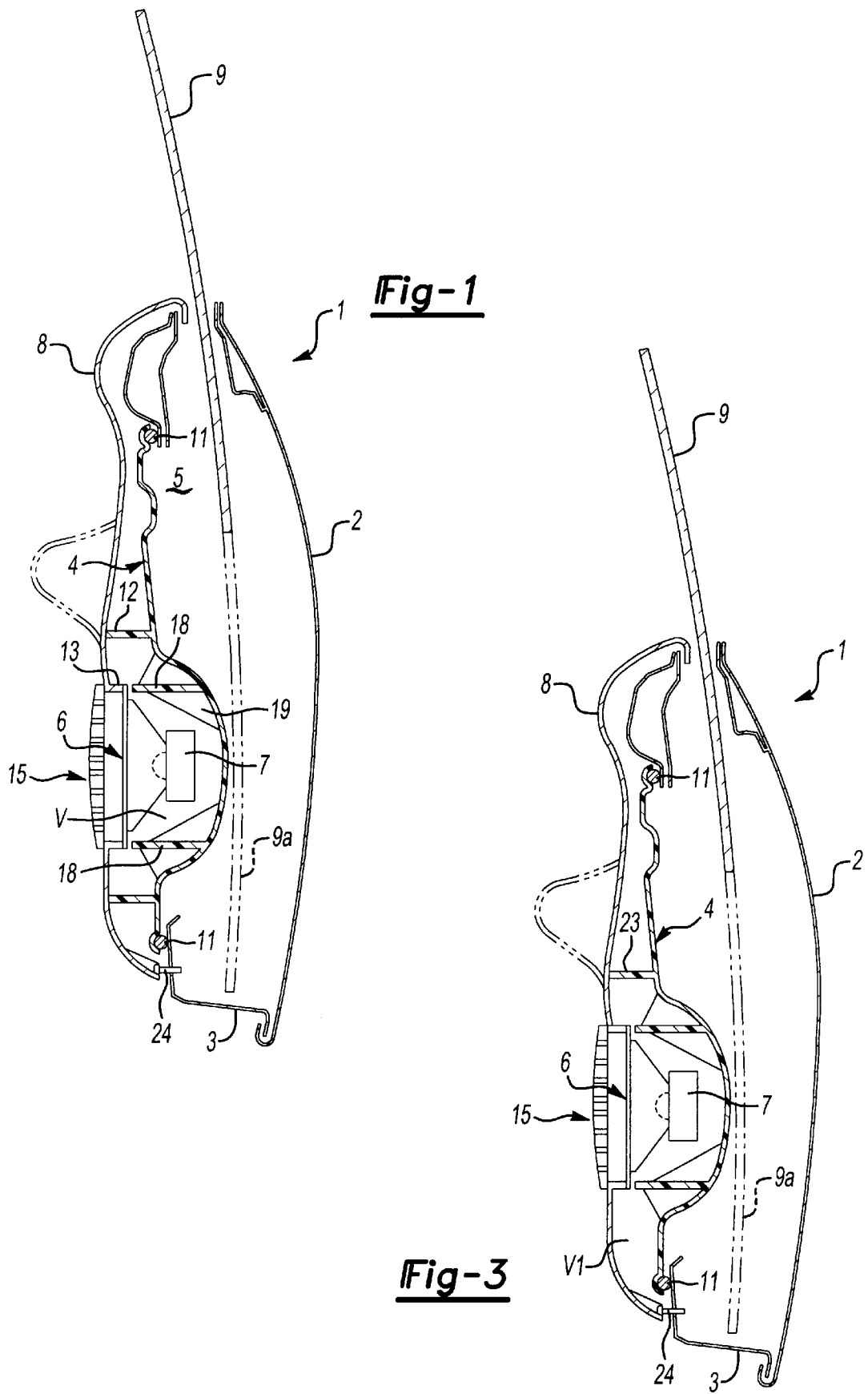

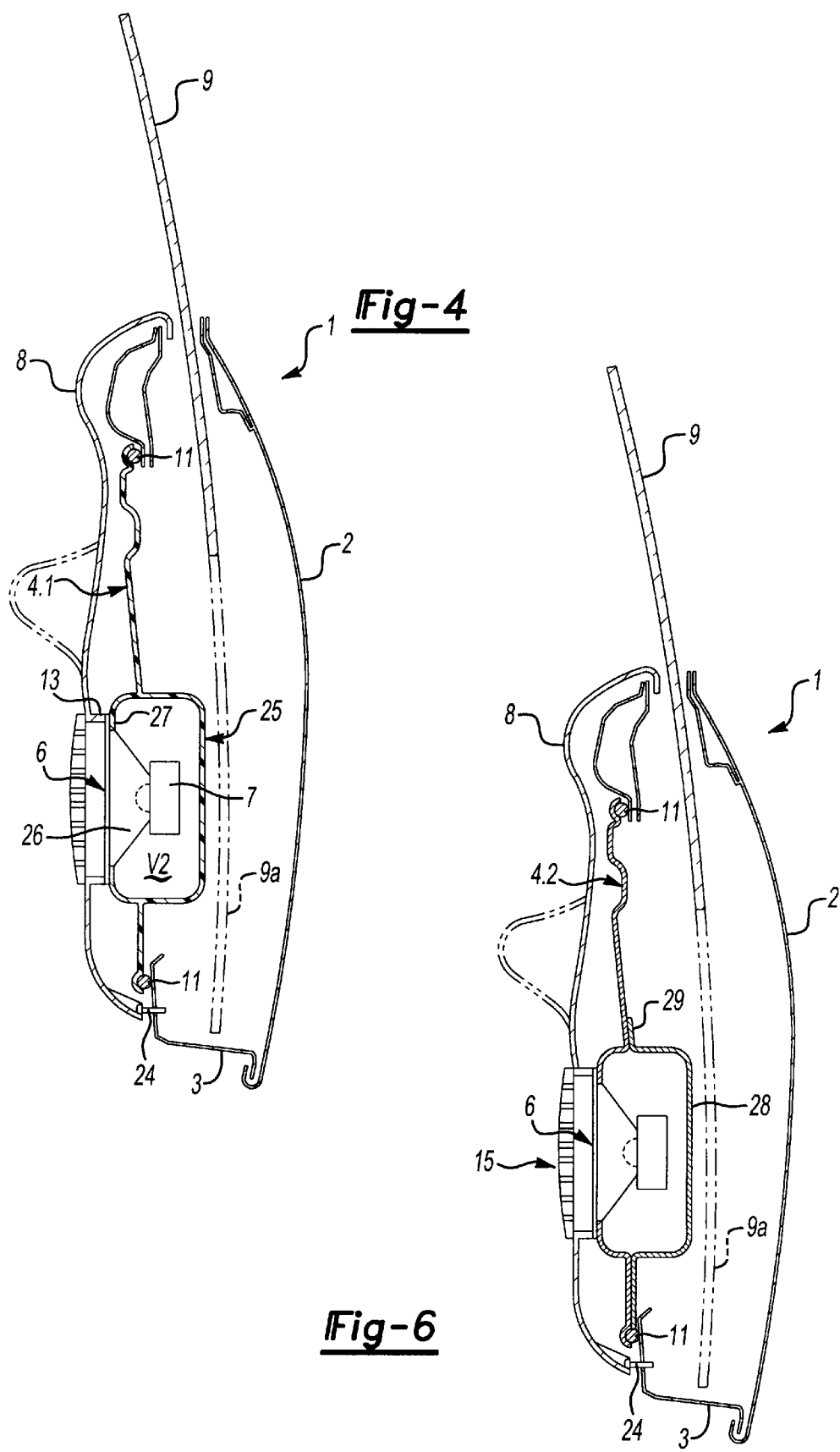

AUTOMOBILE VEHICLE DOOR PROVIDED WITH A MULTICOMPONENT MODULE A PART OF WHICH FORMS AN ACOUSTIC CAVITY

BACKGROUND OF THE INVENTION

The present invention relates to an automobile vehicle door of the type comprising a box structure, a module adapted to be applied on the periphery of an opening formed in the inner side of the box structure, the module carrying components including an acoustic enclosure with a loudspeaker, and an inner trim panel covering the module.

It is known that there are two types of acoustic enclosures for high fidelity sound systems: the closed enclosures which define a closed box containing the speaker which excites the air, and the so-called "bass reflex" enclosures in which the volume of air behind the speaker communicates with the front side of the enclosure through a vent.

In the closed enclosures, the wave emitted by the rear side of the speaker must be absorbed. Only the wave emitted by the front side of the speaker is sent in the direction of the listener, so that all the bass frequencies are eliminated.

On the other hand, with the bass reflex enclosures, the volume of air is no longer closed but open and the wave emitted by the rear side of the speaker is re-emitted toward the front with a judicious arrangement of volumes and lengths of the vent duct so that the frequency of excitation of the rear volume of air is lower than the frequency of resonance of the speaker. In this case, the enclosure emits highly amplified low frequencies. The invention does not concern the choice of the volumes which are considered to be known.

Heretofore, in vehicle doors of the aforementioned type, the speaker was mounted on the sheet metal structure of the door which forms a sealed closed cavity absorbing the rear wave. This arrangement does not permit obtaining strong bass frequencies so that the acoustic efficiency in low frequencies is not as satisfactory as in the case of the bass reflex enclosures. Further, the interior of the doors is not watertight which constitutes an obstacle to the installation of acoustic enclosures of the bass reflex type on a vehicle door since in this case water and noise could enter the compartment of the vehicle through the vent.

SUMMARY OF THE INVENTION

An object of the invention is therefore to solve this problem by permitting the installation of acoustic enclosures of the bass reflex type with a vent on a component-supporting module of an automobile vehicle door.

According to the invention, the module is fixed in a watertight manner on the periphery of the opening of the box structure, means are provided for defining in the module a volume of air excited by the rear wave of the speaker, and a vent is provided in the trim panel for returning the rear wave of the speaker in the direction toward a listening zone.

The vent, which constitutes a calibrated air passage, returns the rear wave of the speaker toward the listening zone, this rear wave exciting the volume of air of the enclosure while the front wave is directed directly toward the listening area. As in the case of conventional bass reflex enclosures, the frequency of resonance of the closed volume of air and the size of the vent are chosen to improve the acoustic power of the enclosure in bass frequencies relative to the acoustic power of the speaker alone.

Further, the sealed mounting of the module on the box structure prevents any penetration of water inside the compartment of the vehicle through the vent, while the volume of air excited by the rear wave of the speaker may be defined by appropriate means.

According to one embodiment of the invention, the volume of air is between the module and the trim panel and is defined by a peripheral rib of the module which is applied in a sealed manner on the trim panel.

The module is preferably made of a plastics material, the rib being molded in one piece therewith.

Further features and advantages of the invention will be apparent from the following description, with reference to the accompanying drawings which illustrate several embodiments of the invention by way of non-limitative examples.

BRIEF DESCRIPTION OF THE DRAWINGS

FIG. 1 is a simplified vertical cross-sectional view of a first embodiment of the vehicle door according to the invention.

FIG. 3 is a simplified cross-sectional view similar to FIG. 1 of a second embodiment of the door according to the invention.

FIG. 4 is a vertical cross-sectional view similar to FIG. 1 of a third embodiment of the door according to the invention.

FIG. 6 is a simplified vertical sectional view of a fourth embodiment of the vehicle door according to the invention.

DETAILED DESCRIPTION OF THE PREFERRED EMBODIMENTS

Figure 2:
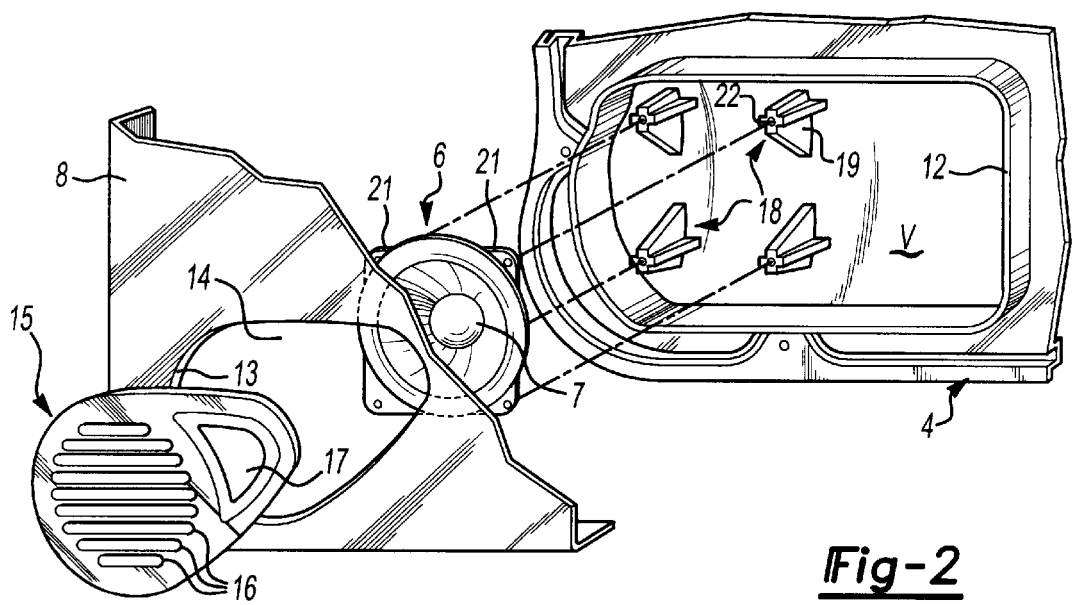
FIG. 2 is a partial exploded perspective view of the door of FIG. 1.

The automobile vehicle door 1 illustrated in FIGS. 1 and 2 comprises an outer panel 2, a box structure 3, a module 4 adapted to be applied on the surround or periphery of an opening 5 formed in the inner side of the box structure 3. The module 4 supports components such as a window raiser (not shown) and an acoustic enclosure 6 with a speaker or driver 7. The door is completed by an inner trim panel 8 covering the module 4.

The door 1 is equipped with a window glass 9 mounted to be slidable in a substantially vertical direction between an upper position and a lower position 9a shown in phantom. The module 4 is fixed on the surround of the opening 5 with the use of sealing elements 11 in a watertight manner with respect to the water liable to penetrate the door 1 through interstices between the glass 9, the panel 2 and the box structure 3.

The acoustic enclosure 6 with its speaker 7 is disposed in a volume of air V excited by the rear wave of the speaker 7, this volume V being, in the embodiment shown in FIGS. 1 and 2, between the module 4 and the trim panel 8 and defined by a peripheral rib 12 of the module 4. The rib 12 preferably is in one piece with the rest of the module 4, made of plastic material, and is applied in a sealed manner on the inner face of the panel 8 around the acoustic enclosure 6. The latter defines an opening 14 which may be closed by a grille 15 having a series of slots 16 and a suitably calibrated vent 17 which permits returning the rear wave of the speaker 7 to travel toward the listening zone in the compartment of the vehicle. The acoustic enclosure constructed in this way is of the bass reflex type.

Extending into the volume V from the inner side of the module 4 are lugs 18, which are in one piece with the module 4 and preferably provided with stiffening webs 19. The speaker 7 is provided with ears 21 having openings for the passage of screws (not shown) for fixing the speaker 7 to the lugs 18, which are provided with openings 22 for receiving the screws. The front facing of the ears 21 bear against an inner flange 13 of the panel 8 surrounding the grille 15.

The volume V is closed from outside elements, such as water, and put in communication with the compartment of the vehicle through the vent 17 and surrounds the speaker 7 and therefore the rear of its cone.

With this arrangement of the component-supporting module 4, the grille 15 and the trim panel 8, a bass reflex acoustic enclosure is formed which substantially improves the acoustic power of the enclosure 6 in respect of bass frequencies relative to the acoustic power of the speaker 7 alone.

Any water running along the glass 9 is stopped by the sealing elements 11 and therefore cannot enter the volume of air V or the compartment through the vent 7.

In the second embodiment shown in FIG. 3, the volume of air V1 is comprised between the module 4 and the trim panel 8 as in the foregoing embodiment. But the peripheral rib 23 of the module 4 only partly defines this volume V1 owing to the fact that it is interrupted in a part of its periphery, this truncated rib 23 being applied in a sealed manner on the inner face of the panel 8. The volume V1 is then defined on its periphery, beyond the interruption of the rib 23, by a sealing element 24 between the panel 8 and the box structure 3 of the door 1.

Figure 5:
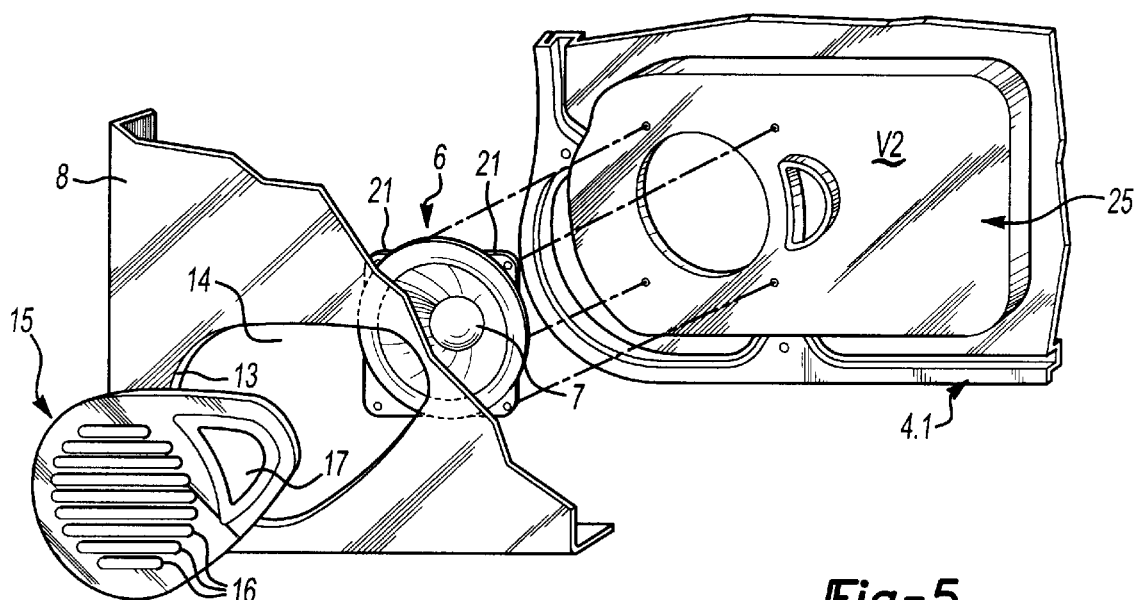
FIG. 5 is a partial exploded perspective view of the door of FIG. 4.

In the third embodiment of the door shown in FIGS. 4 and 5, the volume of air V2 is comprised in the module 4.1 and defined by a wall 25 molded in one piece with the rest of the module 4.1 made of a plastics material. The wall 25 forms a cavity for the speaker 7 and includes an opening 26 in facing relation to the latter defined by a peripheral edge portion 27 which bears against the flange 13 of the panel 8.

In the embodiment illustrated in FIG. 6, the volume of air V3 is comprised between the module 4.2 and a member 28 attached to the module 4.2, this member 28 being disposed on the side of the module 4.2 remote from the trim panel 8. The member 28 constitutes for the speaker 7 a cup-shaped cavity whose edge portion 29 is mounted on the inner face of the module 4.2 by any known suitable means. Further, the remainder of the door 1, and in particular the module 4.2, is similar to the preceding embodiments. However, it should be noted that while in the embodiments of FIGS. 1 to 5 the modules 4 and 4.1 preferably are made of plastics material, the module 4.2 and the member 28 for closing the module may be either metallic, preferably of steel, or of a plastics material.

In the described embodiments, the invention permits providing in a vehicle door an acoustic enclosure of the bass reflex type whose acoustic efficiency in respect of bass frequencies is higher than that of a closed acoustic enclosure with no risk of penetration of water into the vehicle compartment. This result is obtained by means of the sealing of the module 4 with respect to the door and the various arrangements provided for defining the volume of air.

The preceding description is exemplary rather than limiting in nature. Variations and modifications may become apparent that do not depart from the purview and spirit of the invention. The scope of legal protection is limited only by the following claims.

What is claimed is:

1. A vehicle door assembly comprising:
   a door structure;
   a module having an interior and supported on the door structure such that a seal between said door structure and said module prevents water from entering the interior of the module, the interior of the module having a peripherally extending rib extending outwardly from a rear wall;
   a speaker supported by said module such that the speaker faces a listening zone; and
   a door trim panel covering and contacting said module, said trim panel and the module rear wall and the rib defining a volume of air for exitation by a rear wave emitted by said speaker, and a vent provided in said trim panel for returning said rear wave of such speaker in a direction facing toward the listening zone.

2. The door according to claim 1, wherein said module is applied in a sealed manner on said trim panel.

3. The door according to claim 1, wherein said module is applied in a sealed manner on said trim panel, and a sealing element is interposed between said panel and said box structure.

4. The door according to claim 1, wherein said volume of air is defined in said module by a wall of said module forming a cavity for said speaker.

5. The door according to claim 1, comprising a cup-shaped member having an edge portion mounted on said module and disposed on a side of said module remote from said trim panel, said volume of air being defined between said module and said cup-shaped member.

6. The door according to claim 1, wherein said module is made of a plastics material.

7. The door according to claim 1, wherein said module is metallic.

8. The door according to claim 1, wherein said module is made of steel.

9. A vehicle door, comprising:
   a door frame;
   a structure member supported on said frame and having an opening with a periphery;
   a module member supported on said structure member in sealing engagement with said opening, said module member including a panel portion, a wall, and a peripherally extending a rib extending away from said panel and defining a closed chamber; and
   a speaker supported in said chamber facing a listener such that an air vent exists facing the listener to allow air flow from behind said speaker and out of said chamber through said vent toward the listener.

10. The door of claim 9, wherein said rib is continuous and surrounds said chamber entirely.

11. The door of claim 9, further comprising a trim panel adjacent said module, wherein said rib extends along a portion of said chamber and a separate sealing member is interposed between said module and said trim panel along another portion of said chamber.

12. The door of claim 9, further comprising a trim panel supported adjacent said module and engaging said rib, said trim panel including an opening forming said air vent.

13. The door of claim 9, further comprising a plurality of mounting posts within said chamber and extending from said panel portion to support said speaker.

14. A vehicle door assembly, comprising:
   a door frame;
   a module member supported on the door frame, the module member including an inward facing rear wall and a peripherally extending side wall extending generally away from the rear wall;
   a door trim panel including a vent, said door trim panel being supported on the door frame and engaging the side wall such that the rear wall, the side wall and the door trim panel form a chamber, the chamber being closed except for the vent through the door trim panel; and
   a speaker supported at least partially within the chamber such that air flow from behind the speaker exits the chamber through the vent toward a listener.

* * * * *